F. W. BURPEE.
CONVEYER.
APPLICATION FILED APR. 19, 1916.

1,224,445.

Patented May 1, 1917.

WITNESS

INVENTOR
Frank W. Burpee
BY
ATTORNEY

UNITED STATES PATENT OFFICE.

FRANK W. BURPEE, OF SOUTH BELLINGHAM, WASHINGTON, ASSIGNOR TO BURPEE & LETSON, LTD., OF SOUTH BELLINGHAM, WASHINGTON, A CORPORATION OF WASHINGTON.

CONVEYER.

1,224,445.     Specification of Letters Patent.     Patented May 1, 1917.

Application filed April 19, 1916. Serial No. 92,308.

*To all whom it may concern:*

Be it known that I, FRANK W. BURPEE, citizen of the Dominion of Canada, residing at South Bellingham, in the county of Whatcom and State of Washington, have invented a certain new and useful Improvement in Conveyers, of which the following is a specification.

My invention relates to improvements in conveyers and the object of my invention is to provide an endless sprocket chain that is adapted to be mounted upon two sprocket wheels, each placed at a different one of two points distant from each other and both disposed to revolve in the same vertical plane, the several links of which sprocket chain shall include integral carriers of such form as will adapt them conjointly to constitute an endless conveyer which shall be particularly well adapted for use in a fish cannery for the purpose of conveying fresh fish from one point to another and whose carrying surface shall be undulating and substantially continuous between the peripheries of said two sprocket wheels, and shall smoothly and continuously extend around the engaged portions of the peripheries of said sprocket wheels, so that no portion of the fresh fish conveyed thereon, nor other objects, can be accidentally caught between any portion of said sprocket chain and said sprocket wheels and so that such fresh fish when placed on said carrying surface cannot accidentally slip from their positions thereon, and whereby such fresh fish may be readily disengaged and removed from said carrying surface without mutilating them, if a suitable stationary deflector be fixed at a desired point adjacent to said conveyer.

Figure 1:
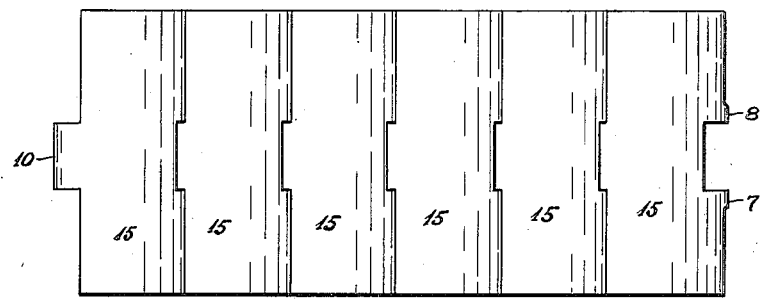
Figure 2:
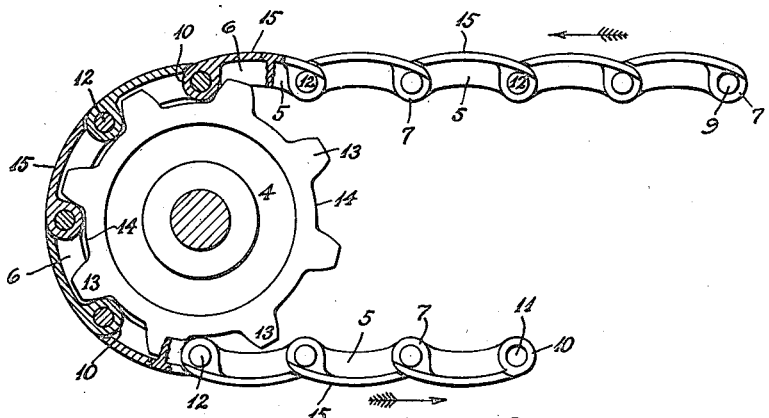

I accomplish this object by devices illustrated in the accompanying drawings, wherein Figure 1 is a plan view of the carrying surface of a section of a conveyer embodying my invention; Fig. 2 is a fragmentary view in side elevation of said conveyer; and Fig. 3 is a view of the sprocket-engaging sides of two links embodied in said conveyer.

Referring to the drawings, throughout which like reference numerals indicate like parts, 4 designates a sprocket wheel operatively associated with a portion of the length of an endless sprocket chain that might be extended to a similar sprocket wheel, not shown, to form an endless conveyer and each of the links of said sprocket chain includes oppositely disposed offset side bars, as side bars 5 and 6.

Figure 3:
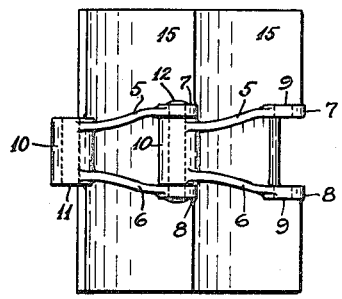

The more widely separated ends of the side bars 5 and 6 of each link are each integral with a disk-like lug, as lugs 7 and 8, which lugs 7 and 8 are provided with oppositely disposed rivet holes 9, as indicated by dotted lines in Fig. 3 and by a circular line in Fig. 2.

The less widely separated ends of the side bars 5 and 6 of each link are both integral with, and are united by, a cylindrically formed lug, as lugs 10, which is of a length to adapt it to fit freely between the lugs 7 and 8 of an adjacent link, as shown more clearly in Fig. 3, and extending in a lengthwise direction through said lug 10 is a rivet hole 11, as indicated by dotted lines in Fig. 3 and by a circular line in Fig. 2, which rivet hole 11 may register with the rivet holes 9 of the lugs 7 and 8 of said adjacent link, so that a rivet, like rivets 12, may be disposed to extend through the rivet holes 9 of said adjacent link and through the rivet hole 11 of said lug 10 thereby to articulate one link to another as more clearly shown in Fig. 3.

The cylindrically formed lugs 10 of the several links of the endless sprocket chain serve to engage the sprockets 13 and the periphery 14 of the rim of the sprocket wheel 4 so that when the sprocket wheel 4 is revolved in a contra-clockwise direction the sprocket chain will be forced to travel in the direction indicated by the arrows in Fig. 2.

The side bars 5 and 6 are curved in their lengthwise directions so that in the course of their travel around the periphery 14 of a sprocket wheel their surfaces adjacent to said periphery 14 will be concentric therewith.

Attached to each of the links of the sprocket chain, and preferably integral therewith, is a carrier (like carriers 15) that extends crosswise thereof, which carrier may be of a length to project sidewise beyond each of the opposite sides of the chain for a desired distance but which shall be of such width as will cause it closely to join and abut the edge of the adjacent like carrier 15 on either of its opposite longer sides, as more clearly shown in Figs. 1 and 2, whereby there will be no space between adjacent ones of the several carriers 15 thus providing the conveyer with a continuous carrying surface.

Each of the carriers 15 is of the form of a segment of a hollow cylinder whose external diameter is such that its radius equals the distance from the axis of the sprocket wheel 4 to the periphery 14 thereof plus the diameter of the cylindrically formed lug 10, whereby when the several links, in the course of their travel, engage with the sprockets 13 and periphery 14 of a sprocket wheel 4 then the carriers 15 of such links will form a smooth semi-cylindrical unbroken surface, as shown in Fig. 2, that will completely shield the sprocket wheel 4 from contract with exterior objects.

In order to maintain a close connection between the abutting edges of adjacent carriers 15 throughout the course of their travel and thereby preventing such edges from separating to form an opening therebetween during the passage of said carriers 15 around the sprocket wheel 4, said abutting edges are beveled in such manner that one of them overlaps the other at all times, as shown in Fig. 2.

In the operation of a conveyer embodying my invention as shown and described, when fresh slippery fish are placed thereon to be conveyed between distant points then the undulating continuous carrying surface normally will prevent such fish from slipping from their positions thereon but will permit them to be slidingly removed therefrom without mutilation by means of a deflector fixed adjacent to the conveyer at a desired point of delivery.

Manifestly, the dimensions of a conveyer embodying my invention may be changed to adapt it to convey other things than fish without departing from the spirit of my invention.

What I claim is:

A conveyer of the class described embodying a sprocket chain, each link thereof including a carrier element curved transversely to present a convexed upper side and a concaved lower side, a pair of angularly-disposed side bars carried by the concaved side of the carrier element and extending transversely thereof, disk-like lugs formed on said side bars at the wider ends thereof, said lugs extending within the side limits of the carrier element, a cylinder carried by the narrower ends of the bars and lying completely beyond the adjacent side edges of the carrier element, the cylinder and lugs being apertured with the cylinder of one element lying between the lugs of the adjacent element, and a retaining pin passed through the registering openings in the lugs and cylinders, the adjacent edges of the carrier elements being beveled and lying at all times in overlapped relations.

In witness whereof, I hereunto subscribe my name this 10th day of April, A. D., 1916.

FRANK W. BURPEE.

Witnesses:
  JOHN A. BURPEE,
  C. B. BURPEE.